J. E. HANGER, Jr.
STEERING MECHANISM FOR VEHICLES.
APPLICATION FILED DEC. 4, 1909.
1,083,399.
Patented Jan. 6, 1914.
2 SHEETS—SHEET 1.
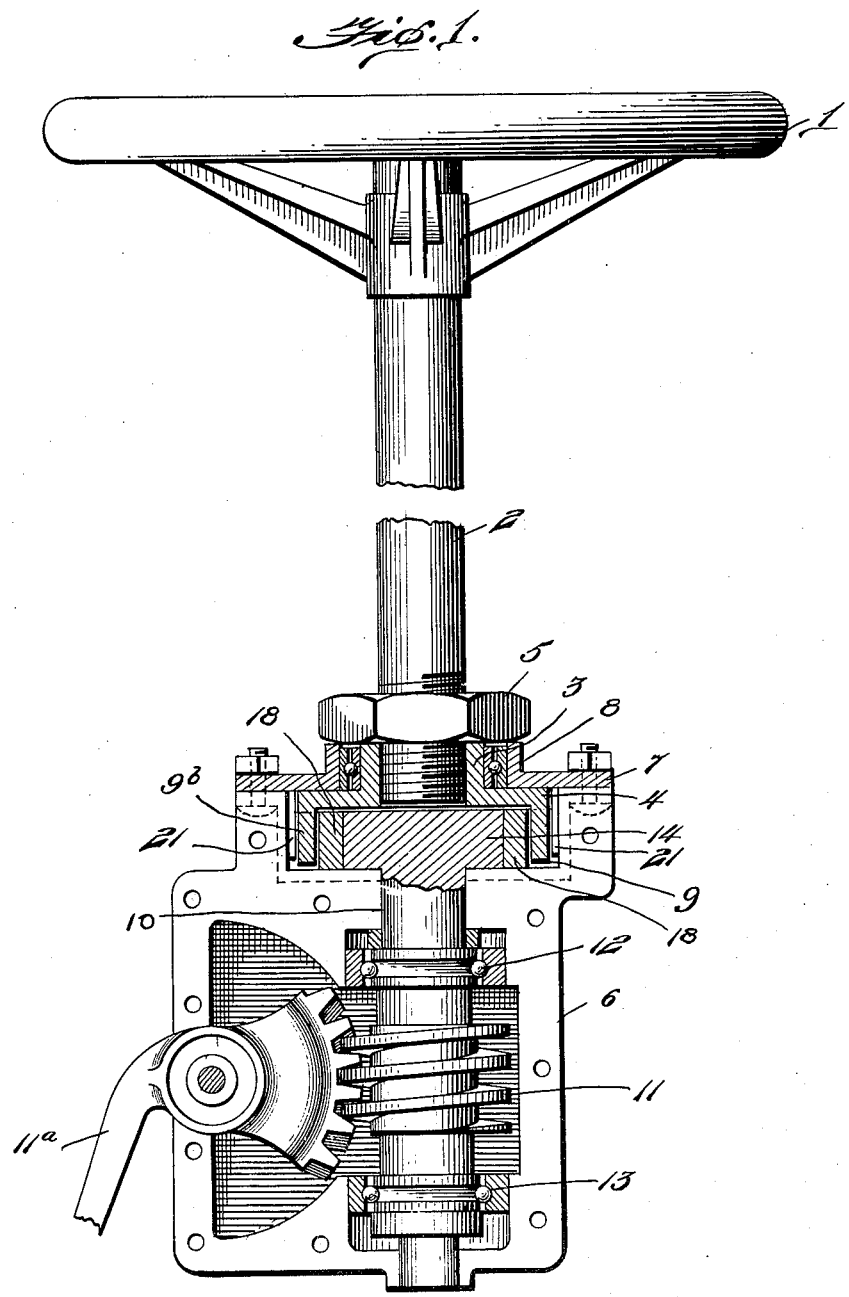

J. E. HANGER, Jr.
STEERING MECHANISM FOR VEHICLES.
APPLICATION FILED DEC. 4, 1909.
1,083,399.
Patented Jan. 6, 1914.
2 SHEETS—SHEET 2.
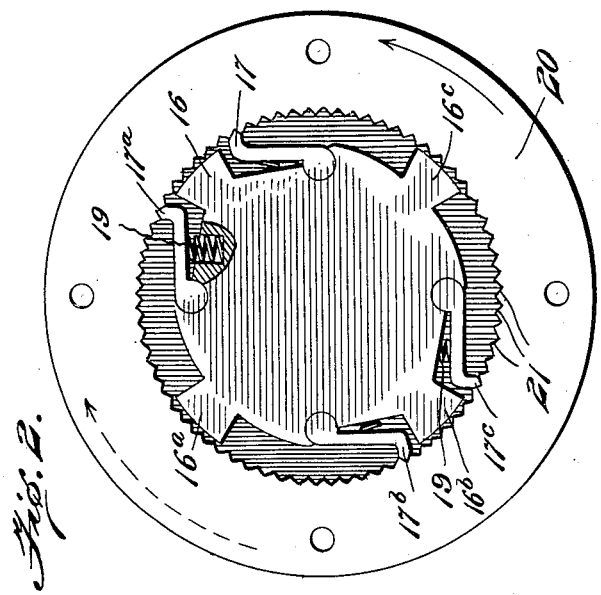
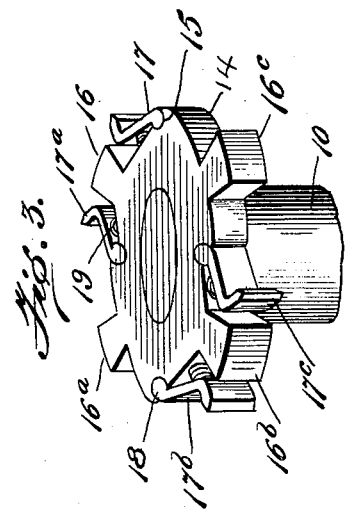
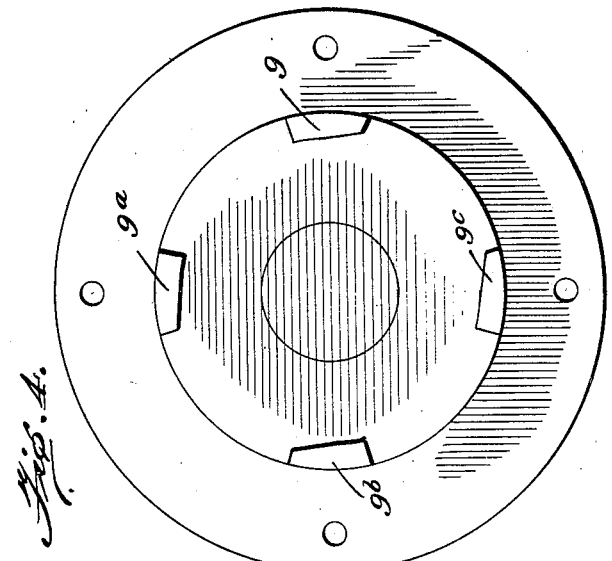
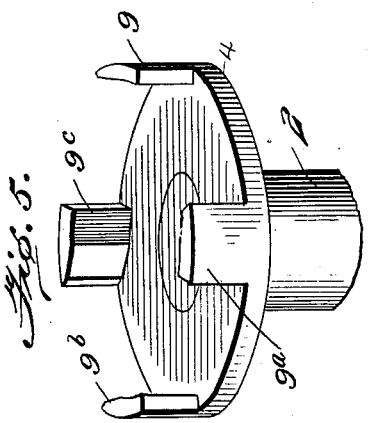
Witnesses
B. M. Offutt
S. V. Caffrey
Inventor
James E. Hanger, Jr.
By Alfred M. Houghton
Attorney

UNITED STATES PATENT OFFICE.

JAMES E. HANGER, JR., OF ATLANTA, GEORGIA, ASSIGNOR OF ONE-HALF TO JAMES R. FENNER, OF JAMESTOWN, NEW YORK.

STEERING MECHANISM FOR VEHICLES.

1,083,399.  Specification of Letters Patent.  Patented Jan. 6, 1914.

Application filed December 4, 1909. Serial No. 531,365.

*To all whom it may concern:*

Be it known that I, JAMES E. HANGER, Jr., a citizen of the United States, and a resident of Atlanta, in the county of Fulton and State of Georgia, have invented certain new and useful Improvements in Steering Mechanisms for Vehicles, of which the following is a specification.

This invention relates to steering mechanisms for vehicles, such as automobiles or the like, and has for an object to provide a safety steering device which will prevent the wheels attached thereto from being swerved, turned, "jolted" or otherwise directed out of their proper course through encountering stones, ruts or other obstructions in the road, which will at all times prevent such shocks from being transmitted to the operator of the vehicle through the steering post, and which will remain in a locked position as regards the vehicle until changed by the operator.

A further object of the invention is to provide a compact and durable safety device which may be attached to any present steering gear of vehicles and which will be simple in construction and operation.

With these and other objects in view my invention comprises a compound sectional steering post, one section of which (hereinafter called the steering post) is provided with a base engaging the other section (hereinafter termed the gear post), the latter section carrying oppositely directed pawls adapted to lock said gear post in whatever position the said gear post may be placed for steering the wheels of the vehicle, and said steering post is provided with means for automatically disengaging said pawls when operated by the driver of the vehicle; and in the embodiment of the present invention, more specifically hereinafter set forth, said steering post is provided with a base having a plurality of downwardly projecting lugs while the coöperating gear post is provided with a plate-like element carrying oppositely directed pairs of spring-pressed pawls engaging with the teeth of an internally toothed ring surrounding said plate-like element, and fixedly secured to the running gear of the automobile, lugs being also provided on the plate-like element, which lugs are adapted to engage with the lugs of the base of the steering post, whereby on rotating the steering post in either direction its lugs disengage the pawls locking the coöperating sections against movement in that direction and also engage the lugs of the coöperating section to impart movement thereto.

In the accompanying drawings, showing one form of a specific embodiment of my invention; Figure 1 is a view partly in elevation and partly in vertical section of the complete device as applied to a worm and sector steering gear; Fig. 2 is a top plan view of the gear post and toothed ring with the steering post removed; Fig. 3 is an elevation of the pawl-carrying element of the gear post; Fig. 4 is a plan view of the base of the steering post; and Fig. 5 is an elevation of the same illustrated in an inverted position.

Referring to Fig. 1, element 1 is an ordinary steering wheel secured to the upper end of rotatable steering post 2. The lower end of the post is threaded and carries through threaded collar 3 the plate-like extension 4, lock-nut 5 being provided for maintaining the collar in place. The plate-like extension is contained within a casing 6 having a cover 7 bolted or otherwise attached thereto, the cover being provided with an upwardly extending annular prolongation 8 surrounding the collar and terminating short of the lock-nut. The lower face of the plate-like extension is provided with a plurality of downwardly extending arms, prongs or projections 9, 9$^a$, 9$^b$ and 9$^c$ (see Fig. 4.) Extending up into the casing is a rod, shaft or gear post 10 carrying the usual worm and sector, or other motion transmitting mechanism, the arm 11$^a$ of the sector being connected to the mechanism for steering the wheels, (not shown). Ball bearings 12 and 13 are provided for this gear post above and below the worm gear 11 respectively. At its upper end this gear post carries a disk-like extension 14, having, as shown, a plurality of circumferential recesses 15 (see Figs. 2 and 3), separated by lugs or projections 16, 16$^a$, 16$^b$ and 16$^c$. In each of these recesses is mounted one of the pawl elements 17, 17$^a$, 17$^b$ and 17$^c$, each pivoted as at 18 and having the spring 19 for normally pressing the pawl into engagement with the teeth of the ring 20. This ring is fixed as regards the vehicle steering mechanism and is shown as a part of the casing, 6, surrounding the gear post 10. It is preferably made integral with this casing in order to insure rigidity when the pawls are locked in the teeth thereof. This ring is provided with teeth 21 adapted to lock the several pawls in whatever position they may chance to rest as regards rotation in one direction for each set of pawls. The pairs of pawls 17, 17$^b$ and 17$^a$, 17$^c$ are oppositely disposed so that when both are engaging the teeth of the ring, the plate-like portion of the gear post 10 is secured in a locked position to the ring and the casing, and hence the gear post is locked except as regards the steering post; the lugs of the steering post being adapted to disengage one pair of said pawls no matter in what direction said steering post is rotated, and to leave another set of the pawls in engagement with the teeth of the stationary ring thus locking the gear post in the opposite direction than that in which the steering post is rotated.

The coöperation between the teeth 21 and the pawls 17, 17$^a$, 17$^b$ and 17$^c$ is such that the pressure of the locked pawls is always at right angles to the faces of the teeth against which they are locked, and the direction of movement of the pawls when free to swing backwardly is almost at right angles to said tooth faces and parallel to the faces of the teeth over which they wipe in the rotation of the steering post. Furthermore, the lines of pressure of the locked pawls and the directions of movement of the free pawls is substantially tangential to the periphery of the extension or plate 14, so that for the amount of rotative energy exerted on the lower steering shaft 10 a maximum resultant is exerted at the periphery of the plate 14 through the pawls 17, 17$^a$, 17$^b$ and 17$^c$ directly against the faces of the teeth 21 to resist the rotation of the shaft, and, on the other hand, when the upper shaft 2 is rotated, but a slight backward movement is necessary to release the pawls from the teeth and the teeth may be a smaller or larger number without sacrificing the holding strength when the pawls are locked thereby. To this purpose, the teeth 21 are formed as or nearly as right-angled teeth, that is, as shown in Fig. 2, with the sides or faces of the teeth meeting at the apexes and the bases of the teeth at angles approximating 90 degrees. The pawls 17, 17$^a$, 17$^b$ and 17$^c$ are formed with long comparatively narrow bodies and at their free ends are outwardly turned to form engaging heads. Said engaging heads are provided with inclined faces so positioned that they fit snugly between opposing faces of adjacent teeth. The engaging heads are outturned at such angles from the bodies of the pawls that the resultant line of force applied at the bases of the pawls will be directed along the bodies of the pawls and substantially at right angles to the opposite faces of the engaging heads, and consequently at right angles to the opposing tooth faces. The other faces of the pawls rest in direct contact with the opposing faces of the adjacent teeth 21 and are always immediately in position to wipe over said tooth faces, with only a slight backward movement to permit it to jump to the next tooth. The close proximity of the teeth and pawls in their normal positively engaged positions renders it, furthermore, impossible for the lower shaft to turn faster than, or beyond the movement of the upper or steering wheel shaft. On the other hand, if the steering wheel is being turned, and from any cause whatever, the lower is influenced to turn faster than the steering wheel shaft, the pawls will lock said lower shaft against such faster rotation; that is, will not allow it to turn faster than or ahead of the upper or steering wheel shaft.

The operation of the device is obvious from the foregoing. When the steering post with its attached arms and the gear post are assembled, the arms 9 of the former rest in the recesses between the lugs on the gear post. On rotating the steering post in the direction of the full-line arrow (see Fig. 2) arms 9 and 9$^b$ of the steering post will engage the pawl 17, and 17$^b$ of the gear post and release the same from engagement with the teeth of ring 20; at the same time arms 9$^a$ and 9$^c$ of the steering post will abut against lugs 16$^a$ and 16$^c$ and cause the rotation of the gear post 10 and the steering of the wheels of the vehicle in the correct direction through the steering gear and worm gear 11.

Upon rotation of the steering post in the direction as indicated by the dotted arrow (Fig. 2) arms 9$^a$ and 9$^c$ of the steering post will disengage the pawls 17$^a$ and 17$^c$ from engagement with the ratchet teeth of the ring 20 and the arms 9 and 9$^b$ of the steering post will abut against lugs 16$^a$ and 16$^b$ of the gear post and thus rotate the same in the direction of rotation of the steering wheel. During this operation the pawls 17 and 17$^b$ will be free to lock the plate 14 the moment it comes to rest.

There is practically no lost motion due to the movement of the lugs to release the pawls and to engage corresponding lugs, because of the fact that the space within which the arms travel, and the relative spacing of the pawls and lugs is just sufficient for the operation of the same without any space for lost motion.

It will be obvious from the foregoing that the shocks and jars on the steering wheel or the like incident to the vehicle wheels striking obstructions in the road, are entirely obviated, and that the danger of resultant accidents to the car and occupant is eliminated by reason of the locked position of the wheels against lateral motion while the car is traveling. Should a wheel of the vehicle strike an obstruction or in any manner tend to turn free from the control of the driver, even in the same direction as that in which he is steering, such tendency will be overcome by reason of the fact that the gear post cannot be operated, even in the same direction as the rotation of the steering post, independently of such post, and consequently can turn no faster than the steering post operates the same.

I may use any number of pawls and lugs to accomplish the above results, but preferably I provide these in sets of two or more in order that the several elements of each set may coöperate and thus heighten the efficiency of the device.

While I have described and illustrated this mechanical movement as attached to and forming part of a vehicle steering mechanism, it is obvious that it may be used in other relations where it is desired to coordinate the rotation of one part of a sectional shaft with another part. It is also obvious that the mechanical movement as applied to steering mechanism, may be located at other parts of the vehicle than the casing surrounding the steering gears. For example, the worm-gear steering mechanism may be dispensed with and another form of gearing used; the stationary ring may be located on the floor of the vehicle or other fixed point without departing from the scope of my invention.

What I claim is:—

1. A steering mechanism, comprising in combination, a stationary casing having an internal annular rack consisting of inwardly extending equally-sided radial teeth, a shaft provided with a head fitted to rotate in said casing and having peripheral recesses formed therein, a plurality of oppositely-extending pairs of angularly shaped pawls, means to press said pawls outwardly into tangential position and at substantially right angles to the opposing faces of said ratchet teeth whereby an outward radial pressure of the pawls is exerted against said rack, and whereby said shaft is locked against rotation in both directions, a second shaft journaled in said casing, and means carried thereby to alternately compress radially either set of pawls out of engagement with the teeth on said rack to release the first mentioned shaft from locked position for rotation by the operator, substantially as described.

2. A steering mechanism, comprising in combination, a stationary casing having an internal annular rack consisting of inwardly-extending equally-sided radial teeth, a shaft provided with a head fitted to rotate in said casing and having peripheral recesses formed therein and pawl seats adjacent said recesses, a plurality of oppositely-extending pairs of pawls pivotally seated in said pawl seats, springs seated in said head intermediate the ends of the pawls adapted to press the pawls outwardly into engagement with the opposing faces of said ratchet teeth whereby an outward radial pressure is exerted against said rack, and whereby said shaft is locked against rotation in both directions, a second shaft journaled in said casing, an annular head thereon, and projecting beveled lugs carried thereby and riding over the arms of the pawls to alternately compress radially either set out of engagement with the teeth on said rack to release the first mentioned shaft from locked position for rotation by the operator, substantially as described.

3. A steering mechanism, comprising in combination, a stationary casing having an internal annular rack consisting of inwardly-extending equally sided radial teeth, a shaft provided with a head fitted to rotate in said casing and having peripheral recesses formed therein, a plurality of oppositely-extending pairs of pawls in substantially tangential position and provided with outwardly extending engaging heads adapted to radially bear upon said rack, means to press said pawls outwardly into said engagement with the rack, whereby to exert an outward radial pressure against same and to lock said shaft against rotation, a second shaft journaled in said casing, and means carried thereby to alternately compress radially either set of pawls out of engagement with the rack to release the first mentioned shaft from locked position for rotation by the operator, substantially as described.

In testimony whereof, I affix my signature in the presence of witnesses.

JAMES E. HANGER, Jr.

Witnesses:
JOHN H. SIGGERS,
ALFRED M. HOUGHTON.